(12) United States Patent
Palmer et al.

(10) Patent No.: US 11,345,507 B2
(45) Date of Patent: May 31, 2022

(54) BIODEGRADABLE CHILD RESISTANT PACKAGING CONTAINER

(71) Applicant: 14th Round Inc., Los Angeles, CA (US)

(72) Inventors: Christopher George Palmer, Los Angeles, CA (US); Adam Kim Richardson, Los Angeles, CA (US); Hongmin Jin, Los Angeles, CA (US)

(73) Assignee: 14TH ROUND INC., Los Angeles, CA (US)

( * ) Notice: Subject to any disclaimer, the term of this patent is extended or adjusted under 35 U.S.C. 154(b) by 10 days.

(21) Appl. No.: 16/933,654

(22) Filed: Jul. 20, 2020

(65) Prior Publication Data

US 2021/0016939 A1 Jan. 21, 2021

Related U.S. Application Data

(60) Provisional application No. 62/876,702, filed on Jul. 21, 2019.

(51) Int. Cl.
*B65D 5/38* (2006.01)
*B65D 5/44* (2006.01)

(52) U.S. Cl.
CPC .............. *B65D 5/38* (2013.01); *B65D 5/44* (2013.01); *B65D 2215/02* (2013.01); *B65D 2215/04* (2013.01)

(58) Field of Classification Search
CPC ... B65D 5/38; B65D 7/10; B65D 9/08; B65D 11/12; B65D 2583/0468; B65D 65/466
See application file for complete search history.

(56) References Cited

U.S. PATENT DOCUMENTS

| 5,082,137 A | 1/1992 | Weinstein |
| 6,047,829 A | 4/2000 | Johnstone et al. |
| 6,230,893 B1 | 5/2001 | Karow |

(Continued)

FOREIGN PATENT DOCUMENTS

| CA | 2634500 A1 | 12/2009 |
| CN | 104648749 B | 10/2017 |

(Continued)

OTHER PUBLICATIONS

Patent Cooperation Treaty, International Search Report and Written Opinion, PCT/US2020/042801, dated Sep. 24, 2020, Applicant: 14th Round Inc.

*Primary Examiner* — Mollie Impink
(74) *Attorney, Agent, or Firm* — Flener IP & Business Law; Zareefa B. Flener; Ayhan E. Mertogul

(57) ABSTRACT

A child resistant packaging container includes a cover having at least one access opening disposed through a cover side wall and a drawer sized to fit within the cover. A portion of the cover side wall includes a blocking feature that inwardly extends from the cover side wall. The drawer includes at least two spring tabs that are each connected to the drawer so that a free end of each spring tab extends over and is biased away from a drawer sidewall. The drawer is disposed within the cover so that the at least two spring tabs are accessible from outside of the cover through the at least one access opening, and the free ends are in contact with an interior surface of the cover between the at least one access opening and an end of the blocking feature.

18 Claims, 8 Drawing Sheets

(56) References Cited

U.S. PATENT DOCUMENTS

| | | |
|---|---|---|
| 6,349,831 B1 | 2/2002 | Buss |
| 6,491,211 B1 | 12/2002 | Evans et al. |
| 7,757,843 B2 | 7/2010 | Katsis |
| 9,475,605 B2 | 10/2016 | Everett |
| 10,518,927 B2 | 12/2019 | Chambers |
| D911,167 S | 2/2021 | Tsai et al. |
| 2004/0099565 A1 | 5/2004 | Dehlin et al. |
| 2015/0014203 A1 | 1/2015 | Upchurch et al. |
| 2016/0083170 A1* | 3/2016 | Grosskopf .............. A61J 1/035 206/531 |
| 2018/0257827 A1 | 9/2018 | Drosos et al. |
| 2021/0016918 A1* | 1/2021 | Altman ................... B65D 5/38 |

FOREIGN PATENT DOCUMENTS

| | | |
|---|---|---|
| DE | 202008009673 U1 | 11/2009 |
| DE | 202008009673 U1 | 12/2009 |
| KR | 20150079297 A | 7/2015 |

\* cited by examiner

BIODEGRADABLE CHILD RESISTANT PACKAGING CONTAINER

FIELD OF THE INVENTION

The present invention relates generally to a biodegradable child resistant slide box container, and more particularly to such slide box containers that have a drawer that positively engages a protective cover, preventing the removal of the cover until the drawer is deformed in a specific area or areas and manner by a user.

BACKGROUND OF THE INVENTION

Slide boxes are a very old and commonly used technology. The most popular use of a slide box is probably for the storage of wooden matches, and has been so for over two centuries. The popularity of slide boxes stems from their unique ability to efficiently store small loose items, in such a manner, as to isolate those items from the surroundings, and assure the stored items remain in a flat orientation. The attributes of slide boxes have facilitated their adaptation to pharmaceuticals, pesticides, deodorants, and other products that need protection from, or limited exposure to, the surrounding environment. Because of the nature of products stored within slide boxes it has become important to create slide boxes having a child resistant capability. The most popular means of creating a child resistant slide box is by creating a slide box with a positively engaging drawer and cover. Usually the engagement is released when either the drawer or the cover is deformed by the user in a specific location. In addition to child resistant slide boxes that unlock from the effects of an indirect cover deformation there are child resistant slide boxes that unlock from the direct disengagement of spring tabs.

Packages produced using biodegradable molded fibers or pulp have been developed in recent years. Attempts at creating stable manufacturing methods for child resistant pulp containers have been so far minimal in their effectiveness and usefulness as traditional molding methods have not been able to solve the issues of failsafe assembly of pulp parts so as to contain the materials inside in a consistent, repeatable fashion. Non-linear variants of packages have been produced but their use is limited. Molded fiber containers currently available on the market suffer from deficiencies in functionality, aesthetics, and manufacturability. There is therefore a desire and a need to ensure correct tolerances are met during a molded fiber or pulp container assembly process, and to make the assembly process efficient, reliable, and repeatable. There is also a need for improved containers that have shown to have a less negative impact on the environment while providing consumers with enhanced functionality, aesthetics and design features.

Biodegradable child resistant packages are a new field of invention. Materials normally used in child resistant packages need to be by nature secure, durable, and repeatable. Biodegradability is commonly achieved by using a material that will degrade in an anaerobic and/or an aerobic environment within a set period of time. With the impact of petroleum based plastic resins having a large and reaching effect on the environment it has become more applicable to have materials that can biodegrade naturally in a faster time period so as to have a non-lasting impact on environment.

SUMMARY OF THE INVENTION

According to one aspect of the invention, a child resistant packaging container comprises a cover having an open end opposite a closed end and at least one access opening disposed through a cover side wall. A drawer is sized to fit within the cover. A portion of the cover side wall between the at least one access opening and the open end comprises a blocking feature that inwardly extends from the cover side wall. The drawer comprises at least two spring tabs that are each connected at a first end to an exterior corner of the drawer so that a second free end of each spring tab extends over a drawer sidewall and is biased away from the drawer sidewall. The drawer is disposed within the cover so that the at least two spring tabs are accessible from outside of the cover through the at least one access opening, and the second free ends are in contact with an interior surface of the cover between the at least one access opening and an end of the blocking feature.

According to another aspect of the invention, a child resistant packaging container comprises a cover having an open end opposite a closed end and at least one access opening disposed through a cover side wall. A drawer is sized to fit within the cover. At least a portion of the cover or the drawer is made from a biodegradable material. A portion of the cover side wall between the at least one access opening and the open end comprises a blocking feature that inwardly extends from the cover side wall. The drawer comprises two pairs of spring tabs wherein each spring tab is connected at a first end to an exterior corner of the drawer and extends over a drawer sidewall so that a second free end of the spring tab is biased away from the drawer sidewall. The drawer is disposed within the cover so that the two pairs of spring tabs are accessible from outside of the cover through the at least one access opening, and the second free ends are in contact with an interior surface of the cover between the at least one access opening and an end of the blocking feature.

According to a further aspect of the invention, a child resistant packaging container comprises a cover having an open end opposite a closed end and at least one access opening disposed through each of two oppositely disposed cover side walls. A drawer is sized to fit within the cover. A portion of each of the two oppositely disposed cover side walls between the at least one access opening and the open end comprises a blocking feature that inwardly extends from the cover side wall. The drawer comprises at least two spring tabs wherein each spring tab is connected at a first end to an exterior corner of the drawer and extends over a drawer sidewall so that a second free end of the spring tab is biased away from the drawer sidewall. The drawer is disposed within the cover so that at least one of the at least two spring tabs is accessible from outside of the cover through each of the two oppositely disposed cover side walls, and the second free ends are in contact with an interior surface of each of the two oppositely disposed cover side walls between the at least one access opening and an end of the blocking feature.

BRIEF DESCRIPTION OF THE DRAWINGS

Other aspects and advantages of the present invention will become apparent upon consideration of the following detailed description, wherein similar structures have similar reference numerals.

DETAILED DESCRIPTION

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Figure 1:
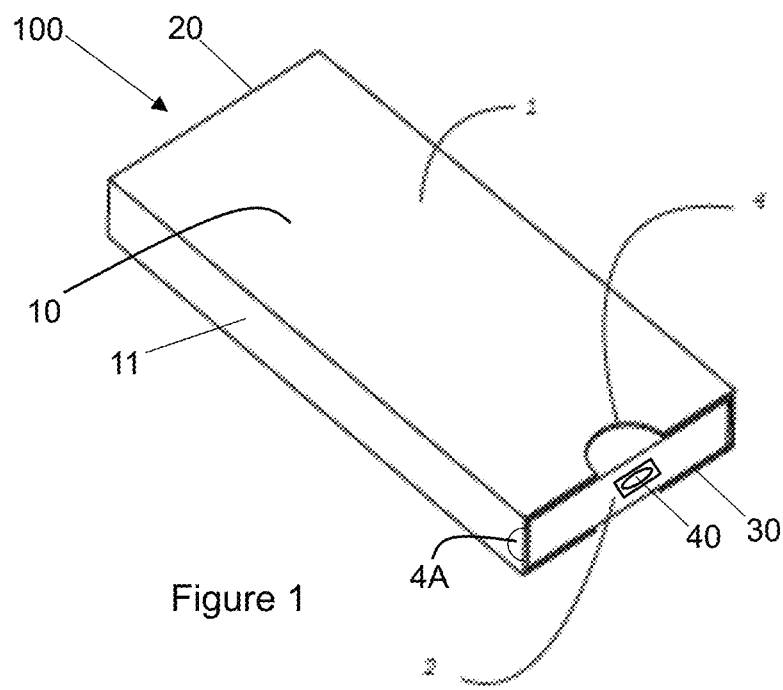
FIG. 1 illustrates a top perspective view of an exemplary embodiment of a child resistant packaging container.
Figure 2:
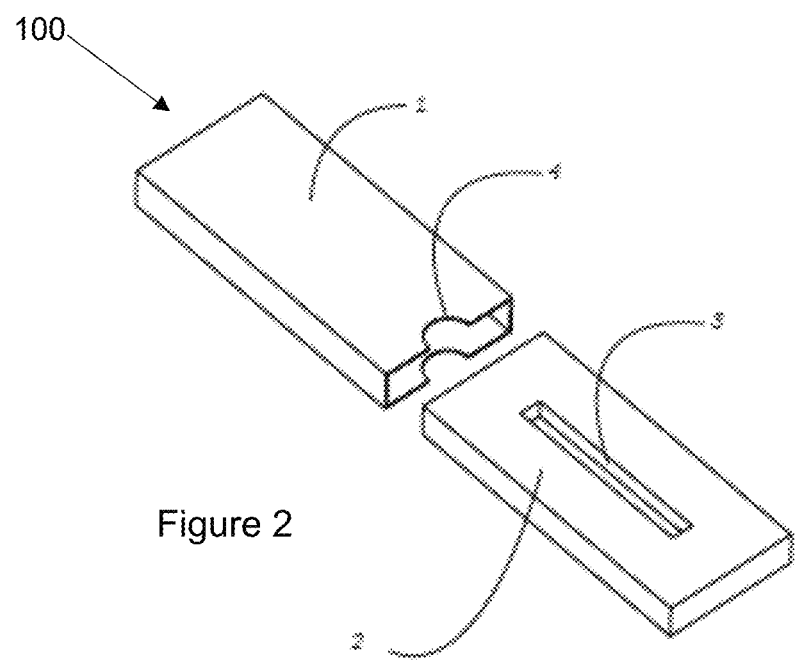
FIG. 2 illustrates a top exploded perspective view of the exemplary embodiment of a child resistant packaging container of FIG. 1.
Figure 3:
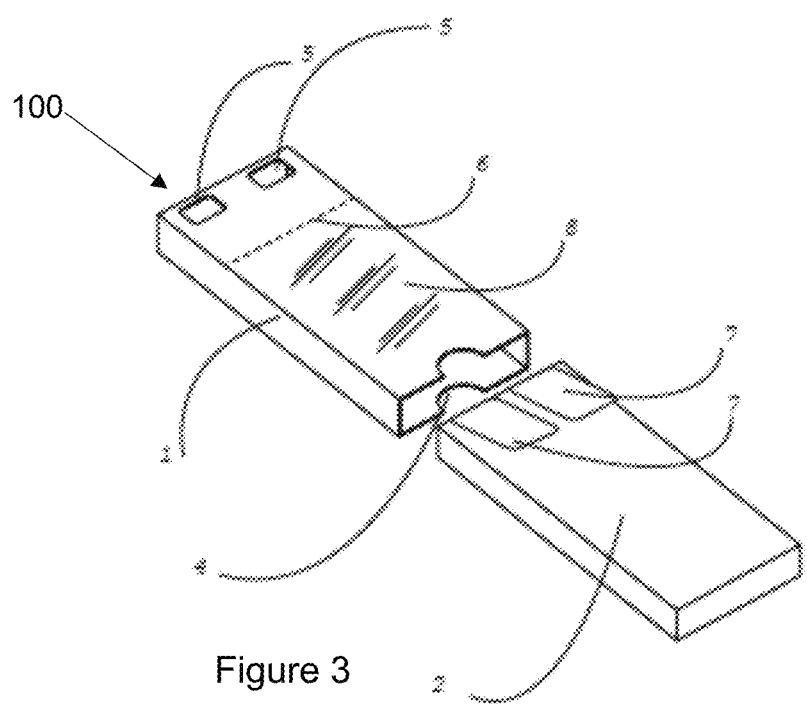
FIG. 3 illustrates a bottom exploded perspective view of the exemplary embodiment of a child resistant packaging container of FIG. 1.
Figure 4:
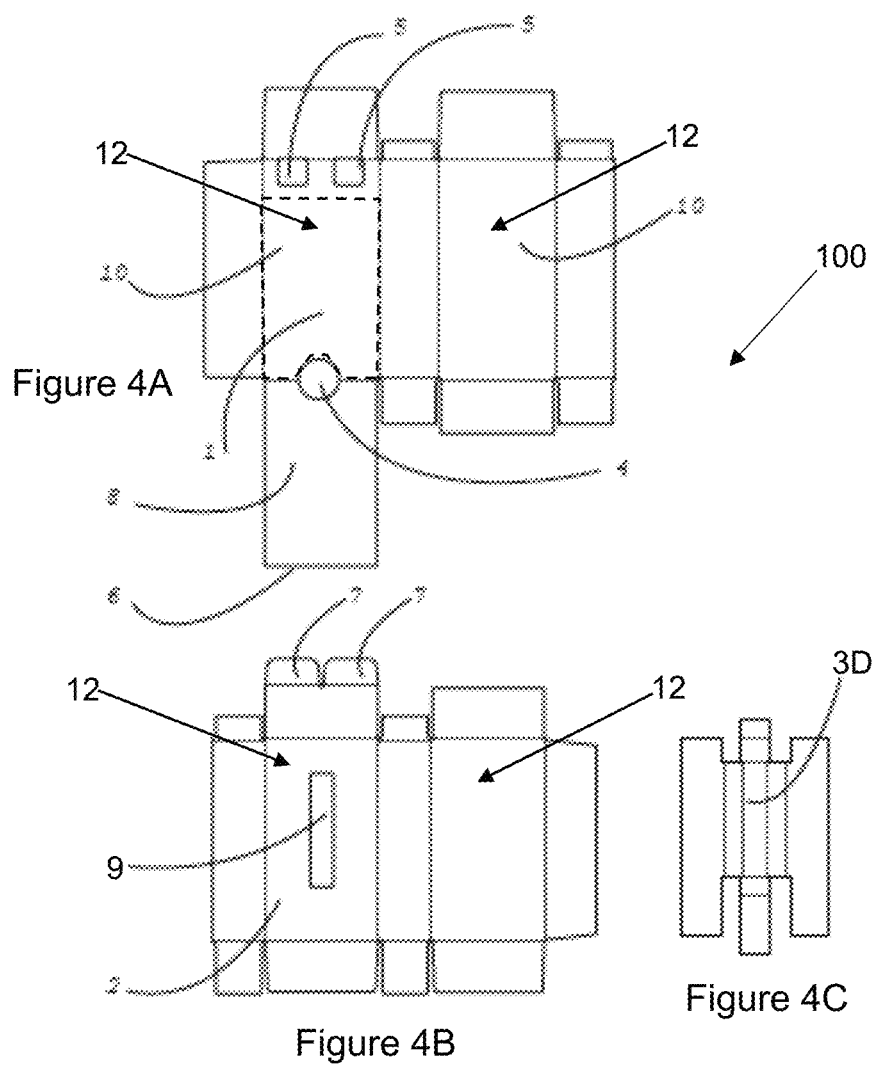
FIG. 4A illustrates an unfolded blank for the cover of the exemplary embodiment of a child resistant packaging container of FIG. 2.
FIG. 4B illustrates an unfolded blank for the drawer of the exemplary embodiment of a child resistant packaging container of FIG. 2.
FIG. 4C illustrates an unfolded blank for the receptacle disposed in the drawer of the exemplary embodiment of a child resistant packaging container of FIG. 2.

Referring to FIGS. 1-3, an exemplary embodiment of a child resistant packaging container 100 (hereinafter referred to as a "CRPC") includes for example without limitation a drawer 2 that slides into and out of a cover 1. The drawer 2 can include one or more product holding receptacles 3. In one embodiment the drawer 2 can be locked inside the cover 1 and prevented from being withdrawn therefrom by a two or more piece locking mechanism (see, e.g., FIG. 3), comprising at least one access opening 5 disposed through a surface of the cover 1, at least one spring tab 7 accessible through the at least one access opening 5 and extending from an end of the drawer 2 back over a side of the drawer 2, and a locking stop feature 6 disposed on an end of a blocking feature 8 disposed inside of the cover 1. With the at least one spring tab 7 blocked by the stop feature 6, the cover cannot be forced open by a child. The two or more piece locking mechanism is described more fully hereinbelow in regard to FIGS. 4-11.

Referring to FIG. 1 an assembled CRPC 100 is illustrated wherein the drawer 2 is disposed inside the cover 1, which has a closed end 20 and an opposite open end 30. In one embodiment access for a user's grasp on an end of the drawer 2 is provided by slots 4 cut into opposite wide sides 10 of the open end 30 as shown. Other embodiments of the cover 1 includes slots 4A cut into opposite narrow sides 11 of the open end 30 as shown on a visible narrow side 11 of the cover 1 by element 4A in FIG. 1. In one embodiment a surface pull tab 40 extends from an end of the drawer 2 so as to facilitate access to the drawer 2 without the slots 4. In other embodiments the CRPC 100 includes both the slots 4 and the pull tab 40. The CRPC 100 can be expanded to have surface detailing or effects with no impact of manufacturing technique or functionality.

FIG. 2 shows an exploded view of the CRPC 100 wherein the drawer 2 has been removed from the cover 1. In this embodiment the drawer 2 includes a receptacle 3. The receptacle 3 is illustrated to be a single elongate slot 3 in this embodiment; however, in other embodiments the receptacle 3 can be one or more slots or depressions of any desired shape, aspect ratio, or size as desired or as may be known in the art. The receptacle 3 can be manufactured as an integral part of the drawer 2 or can be manufactured as a separate fabricated unit that is added to the drawer 2. For example, referring to FIGS. 4B and 4C, which show blanks for the construction of the drawer 2 shown in FIG. 2, a receptacle 3D is shown as a separate blank in FIG. 4C wherein the blank 3D is partly folded up and affixed over the opening 9 in FIG. 4B to create the receptacle 3 shown in FIG. 2.

FIG. 3 shows a bottom perspective view of an exploded view of an embodiment of a CRPC 100 wherein the drawer 2 is completely removed from the cover 1. In this embodiment a two or more piece locking mechanism comprises two access openings 5 disposed through the surface of the cover 1, and two spring tabs 7 that are each attached at one end to a bottom corner of the drawer 2 and that each extend back over the bottom side of the drawer 2. Each of the spring tabs 7 is positioned to align with an access opening 5 when the drawer 2 is pushed entirely into the cover 1. The two or more piece locking mechanism further comprises a blocking feature 8 disposed inside the cover 1, wherein the blocking feature 8 inwardly extends from the cover side wall. In at least one embodiment the blocking feature 8 is connected at one end to the open end 30 and has a free end that defines a locking stop feature indicated as dashed line 6 in FIG. 3. The blocking feature 8 is visible in FIG. 4A which shows a blank for the construction of the cover 1. The function of the two or more piece locking mechanism is further described in detail with regard to FIGS. 4-11 hereinbelow.

FIGS. 4A, 4B, and 4C illustrate exemplary embodiments of blanks for the embodiments of the cover 1, the drawer 2, and the receptacle 3, respectively, as show in FIG. 2. FIG. 4B shows one embodiment of how the spring tabs 7 are created as part of the drawer 2. As noted hereinabove, in other embodiments the receptacle blank 3D and corresponding receptacle opening 3 can include one or multiple other shapes and sizes to define receptacles 3 within the drawer 2 as desired by the manufacturer or as otherwise known in the art.

Figure 5:
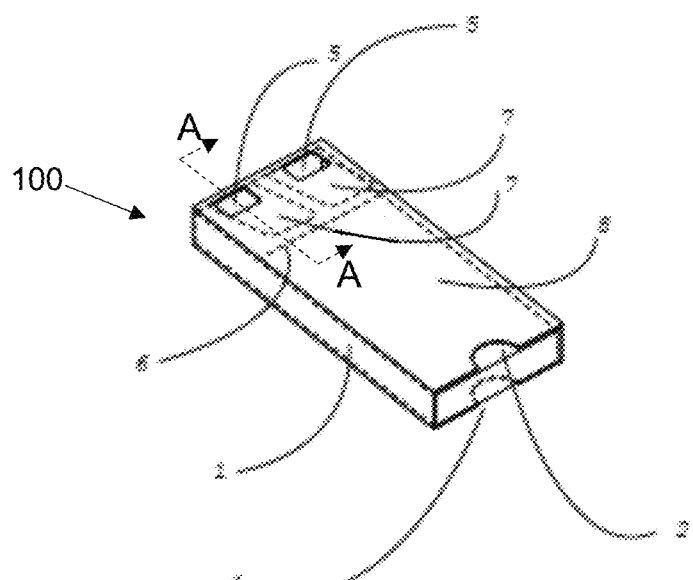
FIG. 5 illustrates a top perspective view of an exemplary embodiment of a child resistant packaging container including hidden lines showing some of the internal structure.

FIG. 5 is another assembled perspective view of an embodiment of a CRPC 100 having two access openings 5 and two tabs 7, one accessible through each access opening 5. Blocking feature 8 and end stop lock feature 6 are shown as dashed lines in FIG. 5. The end stop lock feature 6 is shown to be in close proximity to free ends of the lock tabs 7.

Figure 6:
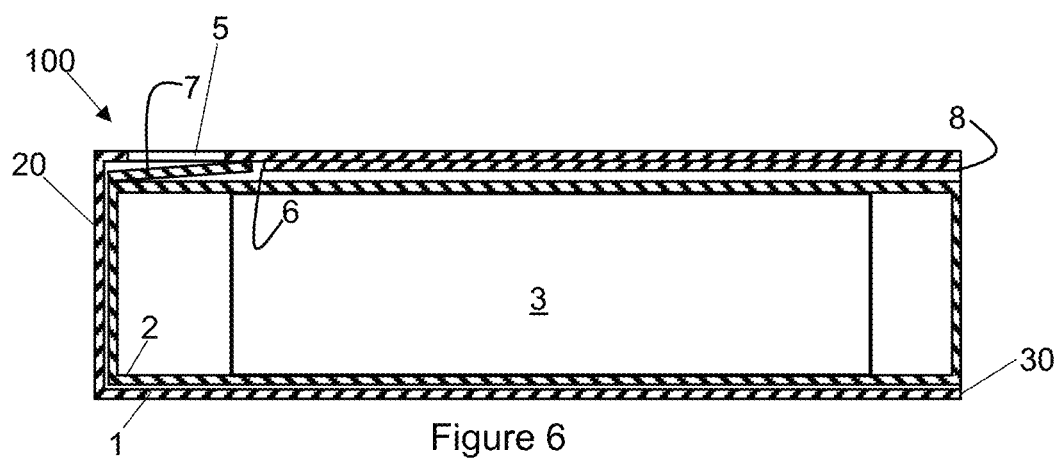
FIG. 6 is a cross-sectional view of the exemplary embodiment of a child resistant packaging container taken generally along the lines A-A of FIG. 5.

FIG. 6 is a cross-sectional view of FIG. 5 taken generally along the lines A-A in FIG. 5. FIG. 6 illustrates the internal geometric relationship of each of the spring tabs 7 to both an access opening 5 and also the stop lock feature 6 on a free end of the blocking feature 8. The internal geometrical relationships between the various components is key to understanding how the two or more piece locking mechanism of the CRPC 100 functions.

In one embodiment the blocking feature 8 is physically formed by the additional flap 8 as illustrated in FIG. 4A. When the blank for the cover 1 as shown in FIG. 4A is folded up the flap 8 ends up in the position shown in the cross-sectional view of FIG. 6 where it is folded over along the open edge 30 of the cover 1. However, in other embodiments the blocking feature 8 could be physically formed by a portion of the blank in FIG. 4A being thicker than the rest of the blank shown in FIG. 4A. In particular in this embodiment the portion of the blank shown in FIG. 4A encompassed by the dashed lines and generally above the slot 4 and below the access openings 5 would be thicker than the rest of the blank. Again, when the blank in FIG. 4A is folded up to make the cover 1, the increased thickness of the portion of the blank encompassed by the dashed lines ends up in the position shown by element 8 in the cross-sectional view of FIG. 6.

In the embodiment shown in FIGS. 5 and 6 each of the two bendable spring tabs 7 extends from a corner of the drawer 2 as illustrated in FIG. 6. In addition, each of the bendable spring tabs 7 is upwardly biased to be in contact with an interior surface of the cover 1 also as shown in FIG. 6. The spring tabs 7 therefore have a planar offset that interacts with an internal surface of the cover 1 at about the same net plane on the internal surface. When the drawer 2 is fully inserted into the cover 1, the upward bias on each of the spring tabs 7 causes interference between each spring tab 7 and the stop lock feature 6 if an attempt is made to pull the drawer 2 out of the cover 1.

For the drawer 2 to be removable from the cover 1, a downward force must be applied to each spring tab 7 through its corresponding access opening 5 to force the upwardly biased spring tab 7 downwardly sufficiently far enough to be below the stop lock feature 6. Further, for a CRPC 100 having two spring tabs 7, a sufficient force must be applied to both of the spring tabs 7 simultaneously to push both of the spring tabs 7 downwardly far enough to be below the stop lock feature 6 so as to allow sliding exit of the drawer 2 from the cover 1. An improvement over similar prior art is therefore evident by the necessity to depress both spring tabs 7 at same time. A child would need to place two fingers into the access opening(s) 5 and push and pull simultaneously. If the child tries to depress only one spring tab 7 at a time the operation fails. The blocking feature 8 is designed to provide a smooth sliding surface for the upwardly biased bendable spring tabs 7 to slide over once the spring tabs 7 have cleared the end stop lock feature 6.

Simultaneous pulling of the drawer 2 must happen as both spring tabs 7 are depressed. Therefore, a minimum of two hands and two fingers from each hand must work in unison to open the package. This has been proven to be an effective combination of physical interaction as to be categorized as child resistant packaging.

As noted, the location and orientation of the spring tabs 7 requires synchronized pushing inward of the spring tabs 7 with pulling of the drawer 2 outwards from the cover 1. The compounded motion of pushing the spring tabs 7 sufficiently below the blocking feature 8 and pushing the drawer 2 forward creates a CRPC 100 that is resistant to children under 5 years of age. Yet the compound motion is easily mastered by an adult, removing the frustrations about use and the concerns about safety common with most child resistant packaging.

Figure 7:
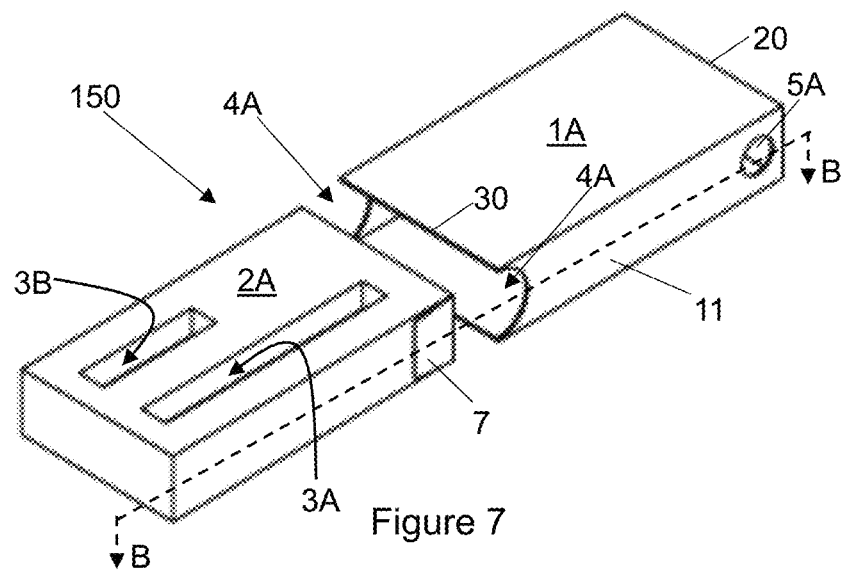
FIG. 7 illustrates a top exploded perspective view of another exemplary embodiment of a child resistant packaging container.

FIG. 7 is an exploded perspective view of another embodiment of a CRPC 150 having two access openings 5A and two tabs 7, one accessible through each access opening 5A. In this embodiment the access openings 5A are disposed through opposite narrow sides 11 of the cover 1A. Though the access openings 5A are illustrated as disposed through the narrow sides 11 in FIG. 7 (and in FIG. 8), in other embodiments the oppositely disposed access openings 5A are disposed through the wide sides 10 of the cover 1A.

Figure 8:
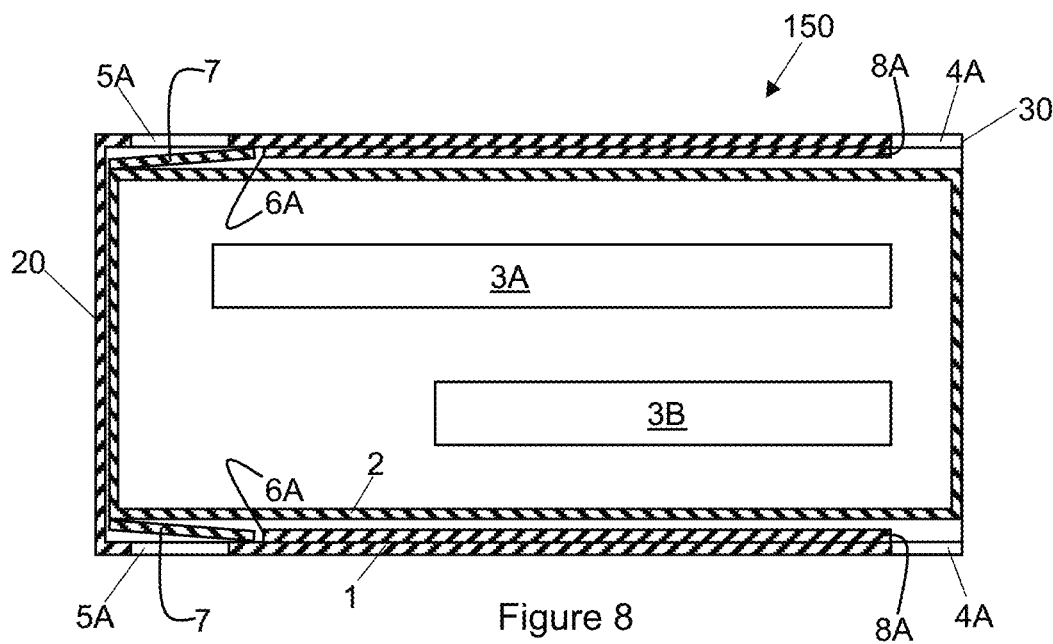
FIG. 8 is a cross-sectional view of the exemplary embodiment of a child resistant packaging container of FIG. 7 fully assembled and taken generally along the lines B-B of FIG. 7.

FIG. 8 is a cross-sectional view of FIG. 7 in an assembled state taken generally along the lines B-B in FIG. 7. FIG. 8 illustrates that blocking feature 8A and end stop lock feature 6A of the CRPC 150 have the same geometrical relationship to one another, to the spring tabs 7, and to the access openings 5A as for the embodiment of the CRPC 100 described hereinabove with regard to FIGS. 3-6. The end stop lock feature 6A is shown to be in close proximity to free ends of the spring tabs 7. Once again, the internal geometrical relationships between the various components is key to understanding how the two or more piece locking mechanism of the CRPC 150 functions.

Figure 9A:
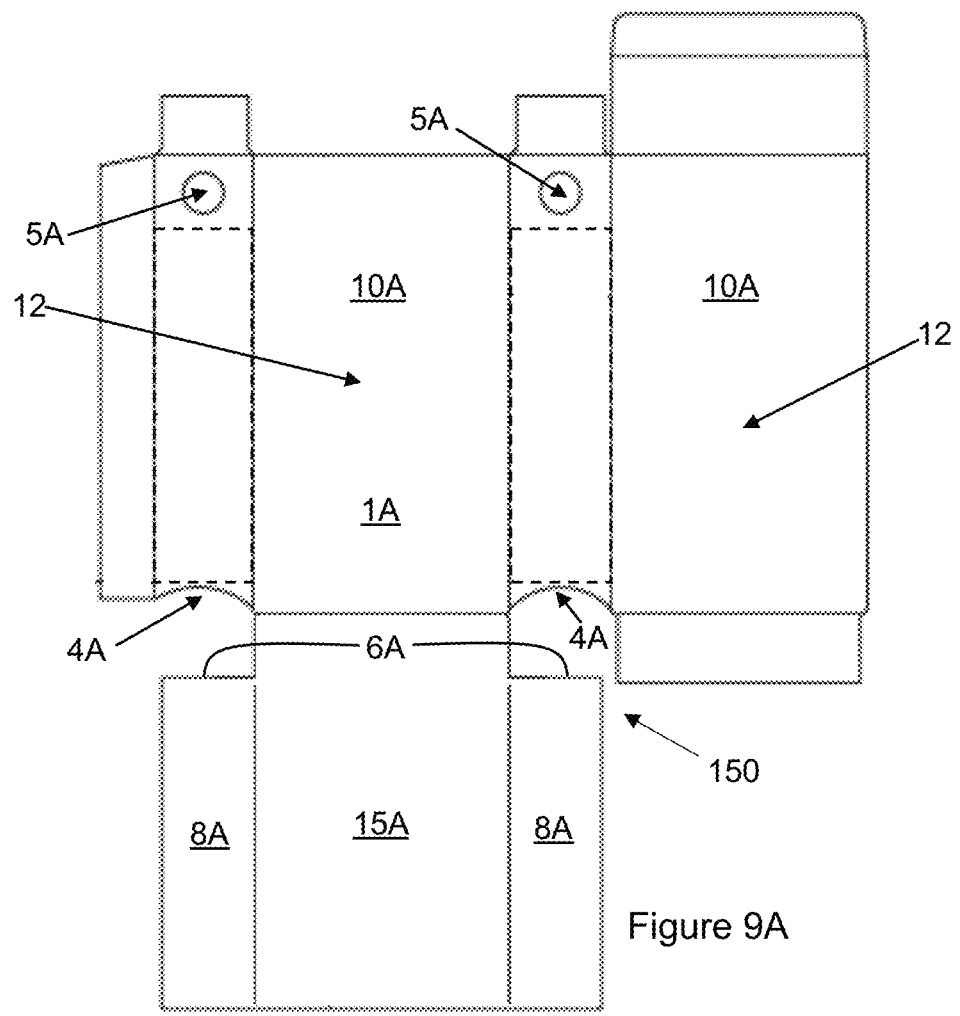
FIG. 9A illustrates an unfolded blank for the cover of the exemplary embodiment of a child resistant packaging container of FIG. 7.
Figure 9B:
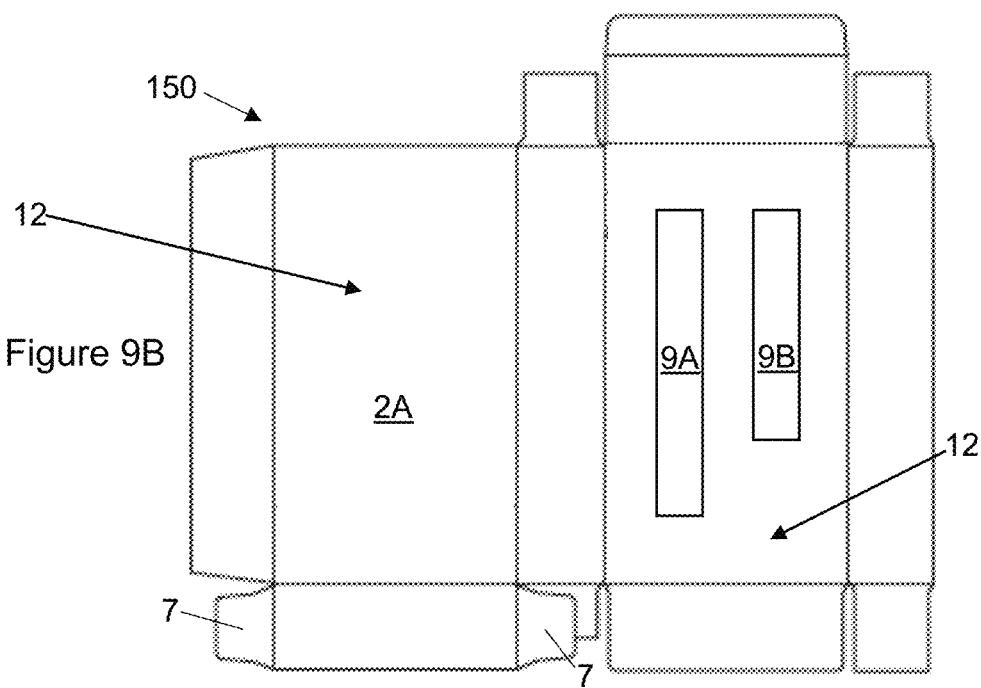
FIG. 9B illustrates an unfolded blank for the drawer of the exemplary embodiment of a child resistant packaging container of FIG. 7.

Referring to FIGS. 9A and 9B, exemplary embodiments of unfolded blanks for the cover 1A and the drawer 2A of the CRPC 150 are shown. Referring to FIG. 9A in particular, the blocking features 8A in this embodiment appear as foldable flaps 8A on the larger flap 15A that has a fold line extending between the arcs of slots 4A. When the blank 9A is folded up to form the cover 1A, the blanks 8A occupy the positions shown in the cross-sectional view in FIG. 8. However, in other embodiments the blocking feature 8A could be physically formed by portions of the blank in FIG. 9A being thicker than the rest of the blank shown in FIG. 9A. In particular in this embodiment the portions of the blank shown in FIG. 9A encompassed by the dashed lines and generally above the arcs 4A and below the access openings 5A would be thicker than the rest of the blank. Again, when the blank in FIG. 9A is folded up to make the cover 1A, the increased thickness of the portions of the blank encompassed by the dashed lines ends up in the positions shown by elements 8A in the cross-sectional view of FIG. 8.

In the embodiment shown in FIGS. 7 and 8 each of the two bendable spring tabs 7 extends from an opposite corner of the drawer 2 as illustrated in FIG. 8. In addition, each of the bendable spring tabs 7 is outwardly biased to be in contact with an interior surface of the cover 1A also as shown in FIG. 8. The spring tabs 7 therefore have planar offsets that interact on opposite internal surfaces of the cover 1A at about the same net plane. When the drawer 2A is fully inserted into the cover 1A, the outward bias on each of the spring tabs 7 causes interference between each spring tab 7 and the stop lock features 6A if an attempt is made to pull the drawer 2A out of the cover 1A.

For the drawer 2A to be removable from the cover 1A, an inward force must be applied to each spring tab 7 through its corresponding access opening 5A to force the outwardly biased spring tab 7 inwardly sufficiently far enough to be within the stop lock feature 6A. Further, for a CRPC 150 having two spring tabs 7, a sufficient force must be applied to both of the spring tabs 7 simultaneously to push both of the spring tabs 7 inwardly far enough to be within the stop lock feature 6A so as to allow sliding exit of the drawer 2A from the cover 1A. An improvement over similar prior art is therefore evident by the necessity to depress both spring tabs 7 at same time. A child would need to place a finger and a thumb into the oppositely disposed access opening(s) 5A and push and pull simultaneously. If the child tries to depress only one spring tab 7 at a time the operation fails. The blocking features 8A are designed to provide smooth sliding surfaces for outwardly biased bendable spring tabs 7 to slide over once the spring tabs 7 have cleared the end stop lock features 6A.

Simultaneous pulling of the drawer 2A must happen as both spring tabs 7 are depressed. A minimum of two hands and two fingers from each hand must work in unison to open the package. This has been proven to be an effective combination of physical interaction as to be categorized as child resistant packaging.

As noted, the location and orientation of the spring tabs 7 requires synchronized pushing inward of the spring tabs 7 with pulling of the drawer 2A outwards from the cover 1A. The compounded motion of pushing the spring tabs 7 sufficiently within the blocking feature 8A and pushing the drawer 2A forward creates a CRPC 150 that is resistant to children under 5 years of age. Yet the compound motion is easily mastered by an adult, removing the frustrations about use and the concerns about safety common with most child resistant packaging.

Referring back to FIG. 7, in one embodiment of the CRPC 150 the drawer 2A includes two receptacles 3A and 3B. The receptacles 3A and 3B are illustrated to be elongate slots; however, in other embodiments the receptacles 3A, 3B can be any number of slots or depressions of any desired shape, aspect ratio, or size as desired or as may be known in the art. The receptacles 3A and 3B can be manufactured as an integral part of the drawer 2A or can be manufactured as a separate fabricated unit that is added to the drawer 2A. For example, a separate blank 3D is illustrated in FIG. 4C wherein the blank 3D is partly folded up and affixed over the opening 9 in FIG. 4B to create the receptacle 3 shown in FIG. 2. Similarly, one or more of the blanks 3D could be partly folded up and affixed over the openings 9A and 9B in FIG. 9B to create the receptacles 3A and 3B shown in FIGS. 7 and 8.

Figure 10:
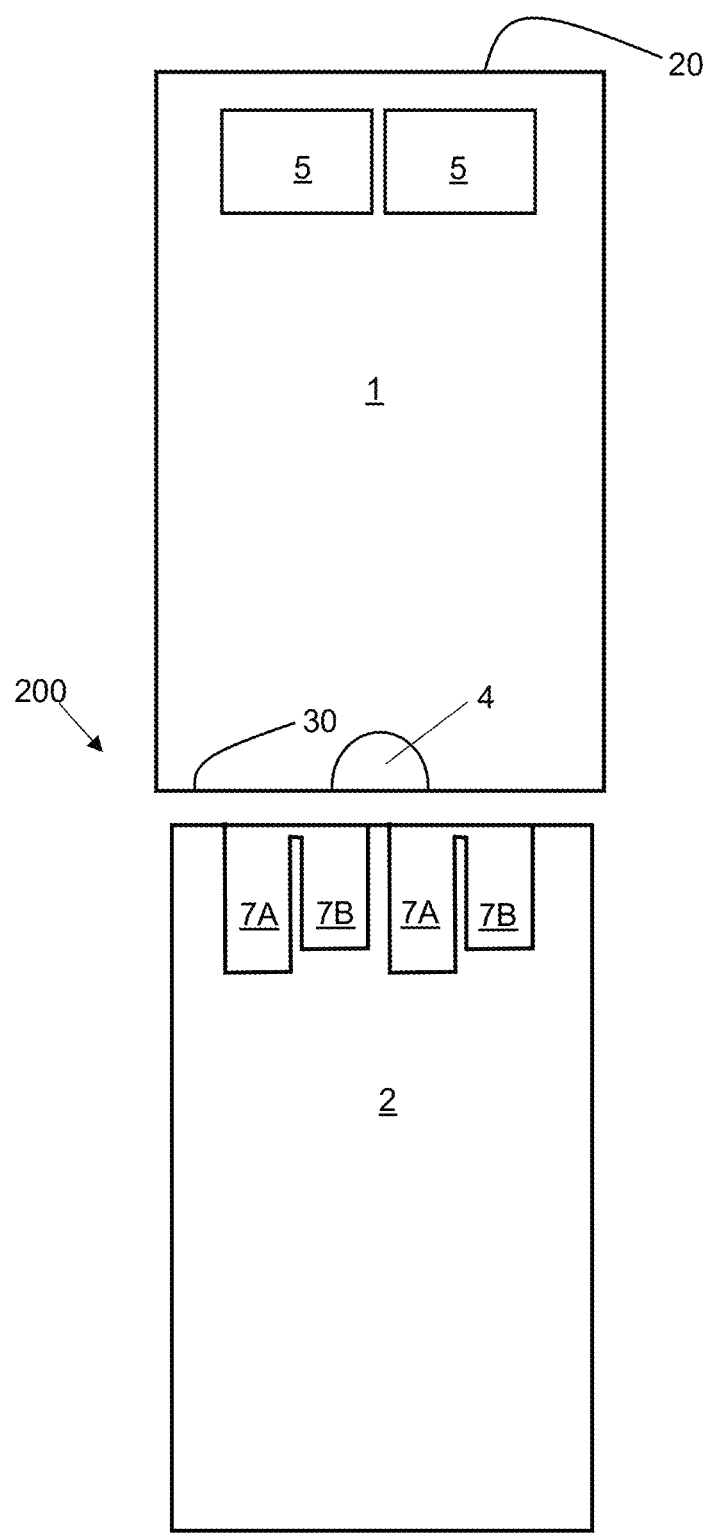
FIG. 10 is a top plan view of a cover and drawer of another embodiment of a child resistant packaging container.

Referring to FIG. 10 another embodiment of a CRPC 200 has a two or more piece locking system including four spring tabs 7A, 7B as shown. This embodiment has the same internal structural geometric relationship between the spring tabs 7A, 7B, the access openings 5, and the stop lock feature 6 on a free end of the blocking feature 8 as the CRPC 100 embodiment disclosed hereinabove with regard to FIGS. 3-6. However, in the CRPC 200 embodiment of FIG. 10, there are spring tabs of two different sizes—namely spring tabs 7A are longer than spring tabs 7B. In this embodiment both the spring tabs 7A are the same length and both the spring tabs 7B are the same length. However, in other embodiments there may be two or more spring tabs all of different lengths or even numbers of spring tabs where pairs of tabs (like the 7A pair or the 7B pair) have the same length. For example, in one possible configuration, there could be a first pair of spring tabs 7A of the same length, a second pair of spring tabs 7B of the same length but different in length than the spring tabs 7A, a third pair of spring tabs 7C of the same length or different length than either of the spring tabs 7A or 7B, and so forth. In FIG. 10, the CRPC 200 illustrates only two access openings 5 with two spring tabs 7A and 7B accessible through each access opening. However, in other embodiments there may be only a single access opening 5, a single spring tab (7A or 7B or 7C, etc.) accessible through each access opening or more than two spring tabs (e.g., 7A, 7B, and 7C) accessible through each access opening 5.

Still referring to FIG. 10, making the spring tabs 7A and 7B different length adds an additional step to a process for removing the drawer 2 from the cover 1 and thereby makes the CRPC 200 harder to open with an enhanced child resistance over the prior disclosed CRPC 100. This is because not only must two of the spring tabs 7A or 7B be depressed simultaneously for the drawer 2 to release from the cover 1 as explained hereinabove, but in addition, the spring tabs 7A, 7B must be depressed in a required sequence. To achieve a release of the drawer 2 from the cover 1, each of the pair of spring tabs 7A must be depressed first while the drawer is simultaneously pulled out (similar to the steps for opening the CRPC 100). However, once the spring tabs 7A have cleared the stop lock feature 6 the user must subsequently also depress each of the pair of spring tabs 7B while simultaneously pulling the drawer 2 out of the cover 1. If a user attempts to press the spring tabs 7A, 7B in any other sequence or combination, then one or both of the spring tabs 7A will interfere with the stop lock feature 6 and prevent removal of the drawer 2 from the cover 1.

Figure 11:
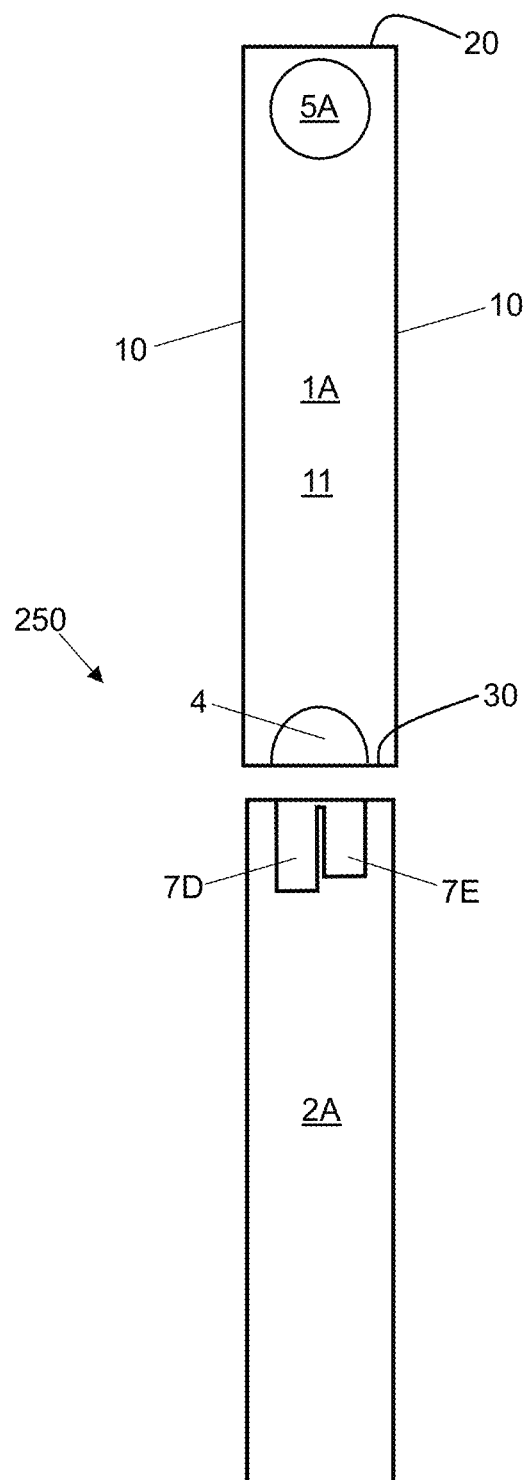
FIG. 11 is a top plan view of a cover and drawer of another embodiment of a child resistant packaging container.

Referring to FIG. 11 yet another embodiment of a CRPC 250 has a two or more piece locking system including a total of four spring tabs comprising two spring tabs 7D, 7E extending from each narrow side 11 of the drawer 2A (only one side is shown but the other side is identical). Though the access openings 5A are illustrated as disposed through the narrow sides 11 in FIG. 11, in other embodiments the oppositely disposed access openings 5A are disposed through the wide sides 10 of the cover 1A.

This embodiment has the same internal structural geometric relationship between the spring tabs 7D, 7E, the access openings 5A, and the stop lock feature 6A on the blocking feature 8A as the CRPC 150 embodiment disclosed hereinabove with regard to FIGS. 7-9B. However, in the CRPC 250 embodiment of FIG. 11, there are spring tabs of two different sizes—namely spring tabs 7D are longer than spring tabs 7E. In this embodiment both the spring tabs 7D are the same length and both the spring tabs 7E are the same length. However, in other embodiments there may be two or more spring tabs all of different lengths or even numbers of spring tabs where pairs of tabs (like the 7D pair or the 7E pair) have the same length. For example, in one possible configuration, there could be a pair of spring tabs 7D of the same length, a second pair of spring tabs 7E of the same length but different in length than the spring tabs 7D, a third pair of spring tabs 7F of the same length or different length than either of the spring tabs 7D or 7E, and so forth. In FIG. 1, the CRPC 250 illustrates only one access opening 5A per narrow side 11 with two spring tabs 7D and 7E accessible through each access opening 5A. However, in other embodiments there may be only a single spring tab (7D or 7E or 7F) accessible through each access opening 5A or more than two spring tabs accessible through each access opening (7D and 7E and 7F). Other embodiments include more than one access opening 5A per side (narrow side 11 or wide 10).

Still referring to FIG. 11, making the spring tabs 7D, 7E different length adds an additional step to a process for removing the drawer 2A from the cover 1A and thereby makes the CRPC 250 harder to open with an enhanced child resistance over the prior disclosed CRPC 150. This is because not only must two of the spring tabs 7D or 7E be depressed simultaneously for the drawer 2A to release from the cover 1A as explained hereinabove, but in addition, the spring tabs 7D, 7E must be depressed in a required sequence.

To achieve a release of the drawer 2A from the cover 1A, each of the pair of spring tabs 7D must be depressed first while the drawer is simultaneously pulled out (similar to the steps for opening the CRPC 150). However, once the spring tabs 7D have cleared the stop lock features 6A the user must subsequently also depress each of the pair of spring tabs 7E while simultaneously pulling the drawer 2A out of the cover 1A. If a user attempts to press the spring tabs 7D, 7E in any other sequence or combination, then one or both of the spring tabs 7D will interfere with the stop lock features 6A and prevent removal of the drawer 2A from the cover 1A.

The required bias of the spring tabs 7, 7A, 7B, 7C, 7D, 7E, 7F, etc. is accomplished in a number of ways, many of which would be evident to those skilled in the art of mechanics. In one embodiment the spring tabs 7-7F, etc. are created with a built in spring feature wherein the spring tabs 7-7F, etc. are created as part of an external side panel of the drawer 2, 2A, so that the location, length, and width of the spring tabs 7-7F, etc. results in an elastic spring loaded tab 7-7F, etc. that is always under preload. This location and position allow for a simplified fabrication and minimal use of materials further improving on the CRPC 100, 150, 200, 250 design.

All of the components of the embodiments of the CRPC 100, 150, 200, 250 described herein, including the cover 1, 1A, the drawer 2, 2A, and the receptacle 3, 3A, 3B can be manufactured, for example without limitation, from a type of a fully biodegradable material such as paper thereby facilitating full recycling and minimal negative impact on the environment. In other embodiments all of the components of the embodiments of the CRPC 100, 150, 200, 250 described herein can be made significantly of one or more types of similar biodegradable materials, such as for example, biodegradable plastics, bio-resins, paper pulps, and paper substrates.

The exemplary CRPC's described herein can be used for the delivery and/or storage of products for human consumption or for the delivery of other materials not for human consumption. Exemplary materials that can be contained include without limitation 510 cartridges, resins, liquids, syrups, concentrates, soaps, inks, gels, solids, and powders. The exemplary materials can be contained directly within the drawer, within one or more receptacles of the drawer, within fluid-grade drawer receptacles, and/or within individually wrapped or sealed cartridges, containers, or vessels that are disposed within one or more receptacles of the drawer or otherwise disposed within the drawer for containment of fluids (e.g., waxes, oils, and/or resins).

In one embodiment the cover 1, 1A is made from a structural paper exterior that is designed to enhance strength and rigidity without compromising on aesthetics and ergonomics. The structural paper exterior of the cover 1, 1A is built to help prevent collapse of the drawer 2, 2A and resist side force on the CRPC 100, 150, 200, 250 that is sufficient to allow the CRPC 100, 150 200, 250 to be easily levered open by a child. The drawer 2, 2A is novel and unique in that it can be formed, fabricated or molded as part of the required manufacturing process with the utility aspect of the spring tabs 7-7F, etc. intact.

In some embodiments the child resistant structure utilizes a thin (for example without limitation, less than about 30 microns thick) biodegradable bio based plastic film. The use of a plastic film or durable material has been found necessary to eliminate possible failure of child resistant (CR) testing due to variable methods for tearing open packages that are utilized by children in the CR testing environment. Ripping, biting, and/or chewing paper products has been seen to be a failure point on pure paper only CR products. Laminations of films has long been seen as a solution to the failures, but fossil based plastics (98% of all plastics worldwide) do not biodegrade quickly (taking hundreds of years) and cannot be recycled through a single stream recycling facility. By utilizing bio based films the biodegradability function is intact, and it does not affect single stream recycling of paper. It is noted that child resistant testing studies have shown some concerns of children biting and softening paper packages limiting the effect of some all biodegradable solutions. However, by adding a biodegradable plastic film, strength to the cover 1, 1A is added without causing sustainability issues in recycling or natural decomposition.

Therefore, additional benefit in sustainability is derived by adding a biodegradable plastic film 12 to at least a portion of the cover 1, 1A as indicated in FIGS. 4A and 9A. In another embodiment the drawer 2, 2A is manufactured from one of the biodegradable materials noted hereinabove and/or includes a biodegradable plastic film 12 covering at least a portion of the drawer 2, 2A as indicated in FIGS. 4B and 9B.

Those skilled in the art will note that material tolerance and variations in thickness of the spring tabs 7-7F, etc. and the blocking features 8, 8A will impact functionality to varying degrees that allows for adjustable tension in engagement of the spring tabs 7-7F, etc. and the blocking features 8, 8A. Adjustments can also be made by varying thickness of the material and/or substrate of the cover 1, 1A and/or the drawer 2, 2A. It is further noted that material adjustments, tension of the spring tabs 7-7F, etc. and location of the blocking features 8, 8A and the associated lock stop features 6, 6A are critical to meeting the needs of child resistant testing and that each variant in size, length, and width of the cover 1, 1A and/or the drawer 2, 2A may require finite adjustments with no bearing on the technical function or utility of the unique design. Further, the placement and size of the access openings 5, 5A in the cover 1, 1A is a further technical aspect of the design that is flexible.

Those skilled in the art will appreciate that the invention described herein is susceptible to variations and modifications other than those specifically described, and that each embodiment is also provided with features that may be applicable to other embodiments. It is to be understood that the invention includes all such variations and modifications that fall within its spirit and scope. The invention also includes all the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

INDUSTRIAL APPLICABILITY

The CRPC is made from biodegradable materials and can include an outer film of biodegradable plastic that serves to protect the CRPC from being damaged by saliva from a child's mouth. The CRPC includes a two or more piece locking mechanism that provides a child resistant container requiring the depression of at least two spring tabs simultaneously with one hand while pulling a drawer portion from a cover portion with the other hand. In one embodiment the two or more piece locking mechanism requires a user to apply a sequential depression of multiple pairs of spring tabs with one hand again coupled with a simultaneous pulling of the drawer portion from the cover portion using the other hand. The CRPC can be manufactured in industry for use by consumers.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

We claim:

1. A child resistant packaging container, comprising:
    a cover having an open end opposite a closed end and at least one access opening disposed through a cover side wall; and
    a drawer sized to fit within the cover; wherein
    a portion of the cover side wall between the at least one access opening and the open end comprises a blocking feature that inwardly extends from the cover side wall; wherein
    the drawer comprises at least two spring tabs comprising a first spring tab having a first length and a second spring tab having a second length, wherein the first length is longer than the second length, wherein the at least two spring tabs are each connected at a first end to an exterior corner of the drawer so that a second free end of each spring tab extends over a drawer sidewall and is biased away from the drawer sidewall; wherein
    the drawer is disposed within the cover so that the at least two spring tabs are accessible from outside of the cover through the at least one access opening, and the second free ends are in contact with an interior surface of the cover between the at least one access opening and an end of the blocking feature.

2. The child resistant packaging container of claim 1, wherein the blocking feature comprises a flap of material folded along the open end so that the flap extends into an interior of the cover.

3. The child resistant packaging container of claim 1, wherein the portion of the cover side wall that comprises the blocking feature is a thickened portion of the cover side wall.

4. The child resistant packaging container of claim 1, wherein at least a portion of the packaging container is made from a biodegradable material.

5. The child resistant packaging container of claim 1 wherein at least a portion of the packaging container is covered with a biodegradable plastic film.

6. The child resistant packaging container of claim 1, wherein the at least two spring tabs comprises two pairs of spring tabs, and wherein each pair of spring tabs comprises the first spring tab having the first length and the second spring tab having the second length, wherein the first length is longer than the second length.

7. A method for opening the child resistant packaging container of claim 1 comprising the steps of:
    applying a first force to the first spring tab through the at least one access opening, wherein the first force is sufficient to inwardly depress the second free end of the first spring tab beyond the blocking feature that inwardly extends from the cover side wall, while simultaneously applying a second force to the drawer to pull it outwardly from the cover; and
    when the second free end of the first spring tab has been pulled beyond the end of the blocking feature applying a third force to the second spring tab through the at least one access opening, wherein the third force is sufficient to inwardly depress the second free end of the second spring tab beyond the blocking feature that inwardly extends from the cover side wall while continuing to apply the second force to the drawer to pull it outwardly from the cover.

8. A child resistant packaging container, comprising:
    a cover having an open end opposite a closed end and at least one access opening disposed through a cover side wall; and
    a drawer sized to fit within the cover; wherein
    a portion of the cover side wall between the at least one access opening and the open end comprises a blocking feature that inwardly extends from the cover side wall; wherein
    the drawer comprises two pairs of spring tabs, wherein each of the two pairs of spring tabs comprises a first spring tab having a first length and a second spring tab having a second length wherein the first length is longer than the second length, wherein each spring tab is connected at a first end to an exterior corner of the drawer and extends over a drawer sidewall so that a second free end of the spring tab is biased away from the drawer sidewall; wherein
    the drawer is disposed within the cover so that the two pairs of spring tabs are accessible from outside of the cover through the at least one access opening, and the second free ends are in contact with an interior surface of the cover between the at least one access opening and an end of the blocking feature.

9. The child resistant packaging container of claim 8 wherein at least a portion of the packaging container is covered with a biodegradable plastic film.

10. The child resistant packaging container of claim 8 wherein at least a portion of the cover or the drawer is made from a biodegradable material.

11. The child resistant packaging container of claim 8, wherein the drawer includes an internal receptacle.

12. A method for opening the child resistant packaging container of claim 8 comprising the steps of:
    applying a first force to the first spring tab in each pair of spring tabs through the at least one access opening, wherein the first force is sufficient to inwardly depress the second free ends of the first spring tabs beyond the blocking feature that inwardly extends from the cover side wall, while simultaneously applying a second force to the drawer to pull it outwardly from the cover; and
    when the second free ends of the first spring tabs have been pulled beyond the end of the blocking feature applying a third force to the second spring tab in each pair of spring tabs through the at least one access opening, wherein the third force is sufficient to inwardly depress the second free ends of the second spring tabs beyond the blocking feature that inwardly extends from the cover side wall while continuing to apply the second force to the drawer to pull it outwardly from the cover.

13. A child resistant packaging container, comprising:
    a cover having an open end opposite a closed end and at least one access opening disposed through each of two oppositely disposed cover side walls; and
    a drawer sized to fit within the cover; wherein
    a portion of each of the two oppositely disposed cover side walls between the at least one access opening and the open end comprises a blocking feature that inwardly extends from the cover side wall; wherein the drawer comprises at least two spring tabs, comprising a first spring tab having a first length and a second spring tab having a second length, wherein the first length is longer than the second length, wherein the first spring tab is connected at a first end to a first exterior corner of the drawer and extends over a first drawer sidewall so that a second free end of the first spring tab is biased away from the first drawer sidewall, and the second spring tab is connected at a first end to a second exterior corner of the drawer and extends over a second drawer sidewall that is opposite to the first drawer sidewall so that a second free end of the second spring tab is biased away from the second drawer sidewall; wherein the drawer is disposed within the cover so that at least one of the at least two spring tabs is accessible from outside of the cover through each of the two oppositely disposed cover side walls, and the second free ends are in contact with an interior surface of each of the two oppositely disposed cover side walls between the at least one access opening and an end of the blocking feature.

14. The child resistant packaging container of claim 13 wherein at least a portion of the packaging container is made from a biodegradable material.

15. The child resistant packaging container of claim 13 wherein at least a portion of the packaging container is covered with a biodegradable plastic film.

16. The child resistant packaging container of claim 13, wherein the drawer includes an internal receptacle.

17. The child resistant packaging container of claim 13, wherein the at least two spring tabs comprises two pairs of spring tabs, wherein each pair of spring tabs comprises a first spring tab having a first length and a second spring tab having a second length, wherein the first length is longer than the second length.

18. A method for opening the child resistant packaging container of claim 17 comprising the steps of:

applying a first force to the first spring tab in each pair of spring tabs through the two oppositely disposed cover side walls, wherein the first force is sufficient to inwardly depress the second free ends of the first spring tabs beyond the blocking feature that inwardly extends from each of the oppositely disposed cover side walls, while simultaneously applying a second force to the drawer to pull it outwardly from the cover; and when the second free ends of the first spring tabs have been pulled beyond the ends of the blocking features applying a third force to the second spring tab in each pair of spring tabs through the two oppositely disposed cover side walls, wherein the third force is sufficient to inwardly depress the second free ends of the second spring tabs beyond the blocking feature that inwardly extends from each of the oppositely disposed cover side walls while continuing to apply the second force to the drawer to pull it outwardly from the cover.

* * * * *